United States Patent [19]

Crowe

[11] Patent Number: 4,641,126
[45] Date of Patent: Feb. 3, 1987

[54] MULTIPLE-MODE ELECTRICAL POWER AND COMMUNICATIONS INTERFACE

[75] Inventor: Wayne D. Crowe, Houston, Tex.

[73] Assignee: Ferranti-Subsea Systems, Ltd., London, England

[21] Appl. No.: 679,186

[22] Filed: Dec. 7, 1984

[51] Int. Cl.⁴ .................. H04M 11/04; H04B 3/20
[52] U.S. Cl. ............................. 340/310 A; 370/31
[58] Field of Search .................. 340/310 A, 310 R; 455/40; 375/6; 370/31

[56] References Cited

U.S. PATENT DOCUMENTS

| | | | |
|---|---|---|---|
| 3,843,834 | 10/1974 | Burke | 370/31 |
| 4,131,882 | 12/1978 | Hollabaugh et al. | 340/310 A |
| 4,136,327 | 1/1979 | Flanders et al. | |
| 4,399,530 | 8/1983 | Demange et al. | 370/31 |
| 4,413,250 | 11/1983 | Porter | 340/310 A |
| 4,450,555 | 5/1984 | Pays | 370/31 |
| 4,540,875 | 9/1985 | Buttolph, III | 340/310 A |

*Primary Examiner*—Douglas W. Olms
*Assistant Examiner*—Curtis Kuntz
*Attorney, Agent, or Firm*—Norvell & Associates

[57] ABSTRACT

A multiple-mode electrical power and communications interface includes a command encoder (10) modulating the frequency generated by a variable frequency power source (12) for transmission over one of two signal transmission paths (16/26) to a remotely located data acquisition and transmission network (32). The signal transmission paths (16/26) are connected via inductive couplers (20/24) to different directional control stages (50/52) which selectively enable corresponding frequency separators (54/62) for filtering the command component from the power component and applying the former to a command decoder (56). The direction control stages enable one of a pair of local transmitters (58/64) to send information encoded by a data encoder (60) over the other of the two signal transmission paths. A mode shifting transmit/receive switch (15) simultaneously and separately connects the two signal paths to the power source (12) and a data decoder (30). In the event of loss of one of the two signal paths, the mode shifting switch (15) can sequentially connect the power source (12) and data decoder (30) to the same signal transmission path.

16 Claims, 5 Drawing Figures

MULTIPLE-MODE ELECTRICAL POWER AND COMMUNICATIONS INTERFACE

TECHNICAL FIELD

This invention pertains to electrical transmission networks and, more particularly, to electrical power and communication interfaces providing fixed wire connections between a plurality of distant transmitters and receivers.

BACKGROUND ART

Frequently, industrial applications require the transmission of electrical power and communication signals between a central command location and distant instrumentation and process control devices. Typically, full-duplex signal transmission is desired to provide instantaneous feedback to the central command location of process variables and actuation of process control equipment to enable more accurate regulation of the process. Usually, this requires a first pair of electrical conductors carrying commands from the central command location to a receiver local to the process control equipment and a second pair of conductors conveying instrumentation data back to the command location. These pairs of conductors are exposed to numerous causes of failure such as excessive stress placed on the conductors during operations, kinks which were placed in one or more of the conductors during their installation and which result in open or shorted circuits in one conductor pair, or failure of the couplings between the conductors and the local receiver. In applications requiring electrical transmission between a surface central command location and associated subsea process instrumentation and control equipment, for example, the transmission conductors are typically bound into a single umbilical cable connected to the local receiver by pairs of inductive couplers. The severity of a subsea environment can deleteriously affect the transmission paths, however, by causing the inductive coupler's insulation to fail thereby allowing seawater to enter the umbilical cable.

Regardless of the mode of failure, a loss of any one or pair of electrical conductors undesirably reduces the entire transmission network to a half-duplex mode, ultimately resulting in the loss of instrumentation feedback from the local receiver. The relative inaccessibility of the subsea portions of the transmission conductors, their bulk and their capital and installation costs prevent either quick replacement or restoration of the transmission network to full-duplex operation. Although transmission systems are available for providing full duplex communication over a single conductor pair (U.S. Pat. No. 4,136,327 of Flanders et al, for example), such systems require dedicated local receivers and interfaces between the local receivers and the conductors. Moreover, damage of a single conductor in such a full duplex conductor pair will immediately impair the integrity of the entire network.

SUMMARY OF THE INVENTION

Accordingly, it is one object of the present invention to provide an improved electrical transmission interface.

It is another object to provide an electrical transmission interface demonstrating enhanced transmission reliability in severe operating environments.

It is still another object to provide an electrical transmission interface enabling full duplex transmission during normal operating conditions.

It is yet another object to provide an electrical transmission interface endowed with redundant transmission paths.

It is a further object to provide an electrical transmission interface allowing continued transmission after suffering the loss of one of its transmission paths.

It is a still further object to provide an electrical signal transmission interface exhibiting improved noise immunity.

It is also an object to provide a method for enhancing the reliability of electrical transmission between distantly separated transmitters and receivers.

These and other objects are achieved with a multiple-mode electrical power and communications interface in which a central command encoder modulates a variable frequency power source to transmit command signals coupled by a mode select switch via a first transmission path provided to a remote network. A second path is either simultaneously or sequentially coupled by the switch to conduct data signals from a transmitter in the remote network back to a central data decoder. The remote network separates command components from the power components of the transmitter signal, and applies the command components to a local receiver for decoding while the power component provides local power. One of a pair of local transmitters coupled across different conductor paths is enabled to transmit encoded instrumentation data back to the central command location via the second transmission path. A pair of direction control elements are responsive to the level of the power component across each of the transmission paths to selectively enable filtering circuits for separating the command component from the power component during transmission by the variable frequency source along the corresponding path and for enabling transmission of the encoded instrumentation data whenever power is not being received along one of the paths.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

Figure 1:
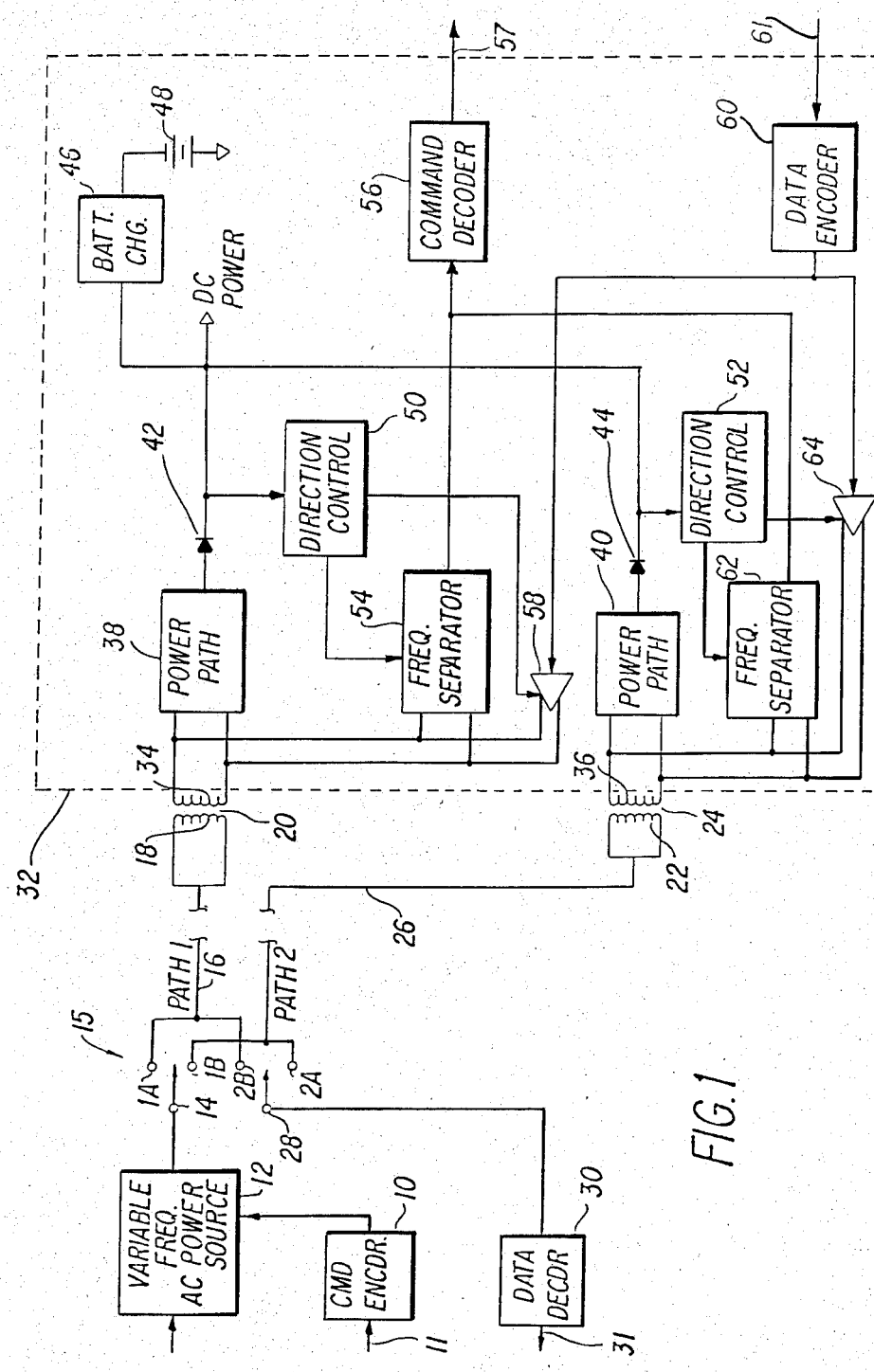
FIG. 1 is a single line electrical block schematic diagram of an embodiment of the present invention.

FIG. 1 illustrates a multiple-mode electrical power and communication interface in which a command encoder 10 receives instructions from a central command location such as a command panel or hose computer (not shown) via input lead 11 and generates and eight bit, pulse width modulated, frequency shift keyed command signal. Six of the binary bits represent binary coded functions; one bit serves as a start of message indicator, and one bit provides parity for error detection. The command signal, which uses three discrete frequencies to denote reset, space and mark conditions, is applied to modulate a variable frequency, alternating current power source 12, resulting in a composite signal having a command component and a power component being applied to a first switching element 14 of a mode select, transmit/receive switch 15 having two poles 1A, 1B for coupling source 12 to either of two transmission paths, path 1 and path 2. The composite signal is conducted via the transmission path 1 provided by a single cable pair 16 extending between switching element 14 and the primary side 18 of a distantly located inductive coupler 20. A primary side 22 of a second distantly located inductive coupler 24 is coupled via a second single conductor pair 26 providing the second transmission path, path 2, to switching element 28 of mode select switch 15. Switching element 28 has a pair of poles 2A, 2B for coupling a data decoder 30 to either transmission path 2 or path 1, respectively. Data decoder 30 converts encoded data signals into a format acceptable by the command panel or host computer (not shown) coupled to the decoder via lead 31.

A data acquistion and transmission network 32 receives the secondary sides 34, 36 of inductive couplers 20, 24 which are coupled to separate power paths 38, 40. Power paths 38, 40 each include power transmission and voltage regulation circuits for handling the power components of the composite signals emanating from power source 12. Separate rectifying circuits 42, 44 convert the alternating power component into power for providing direct current to the network and for powering a battery charging circuit 46 which, in turn, charges a local battery 48.

Direction control stages 50, 52 are sensitive to the presence of the power component received across the secondary sides 34, 36 of couplers 20, 24 via transmission paths 16, 26. Upon detection and during the presence of a power component of the composite signal across secondary side 34, direction control stage 50 applies an enabling signal to frequency separator 54, thereby enabling separator 54 to filter and pass the command component of the composite signal from secondary side 34 to a command decoder 56. The decoded command words are applied via lead 57 to control external process equipment such as solenoid and valve actuators (not shown). Simultaneously, and in response to the presence of the received power component, direction control circuit 50 holds a local transmitter 58 in a deactivated condition, thereby preventing encoded data signals generated by data encoder 60 from being applied to secondary side 34 of coupler 20. When the power component ceases to appear across secondary side 34, direction control 50 terminates the enabling signal applied to frequency separator 54, thereby blocking the passage of signals between secondary side 34 and command decoder 56 and electrically isolating decoder 56 from transmission path 1.

Information acquired from sources such as process monitors and sensors is applied to data encoder 60 via lead 61, converted into variable frequency signals, encoded and converted into a pair of sinusoidal, uplink data signals differing in phase by one hundred eighty degrees for asynchronous mode transmission via one of paths 16, 26. Direction control circuit 52 responds to the presence of the power component of a composite signal generated by power source 12 across secondary side 36 when source 12 is coupled to path 2 via pole 1B, by applying an enabling signal to frequency separator 62, thereby enabling separator 62 to filter the composite signal and to pass the encoded command component between secondary side 36 and command decoder 56. Control stage 52 responds to the absence of a power component across secondary side 36 by terminating the enabling signal applied to frequency separator 62, thereby preventing passage of a command signal component between secondary side 36 and command decoder 56 via frequency separator 62. Control stage 52 continues to hold frequency separator 62 in this disabled condition while transmission path 2 is coupled to data decoder 30 via pole 24. Simultaneously, direction control stage 52 responds to the absence of a command component across secondary side 36 by applying an enabling signal to local transmitter 64 to allow encoded data information generated by encoder 60 to be transmitted to data decoder 30 via transmitter 64, coupler 24, single conductor pair 26, and pole 2A of switching element 28.

In the normal operational mode, power source 12 is coupled via switching element 14 and its pole 1A to path 1 provided by conductor pair 16 while decoder 30 is coupled via pole 2A of switching element 28 to path 2 provided by conductor pair 26. This setting of switching elements 14, 28 provides a full-duplex mode of operation in which the power and command components of a variable frequency, electrical power signal generated by power source 12 are transmitted via path 1 across coupler 20. During the presence of the power component across coupler 20, direction control stage 50 holds frequency separator 54 in an enabled condition, thereby allowing the command component to pass across coupler 20 to decoder 56. In the same mode, the absence of any power component across coupler 24 requires control stage 52 to hold local transmitter 64 in an enabled condition, thereby allowing encoded data signals from encoder 60 to be transmitted via path 2 to decoder 30.

Figure 2:
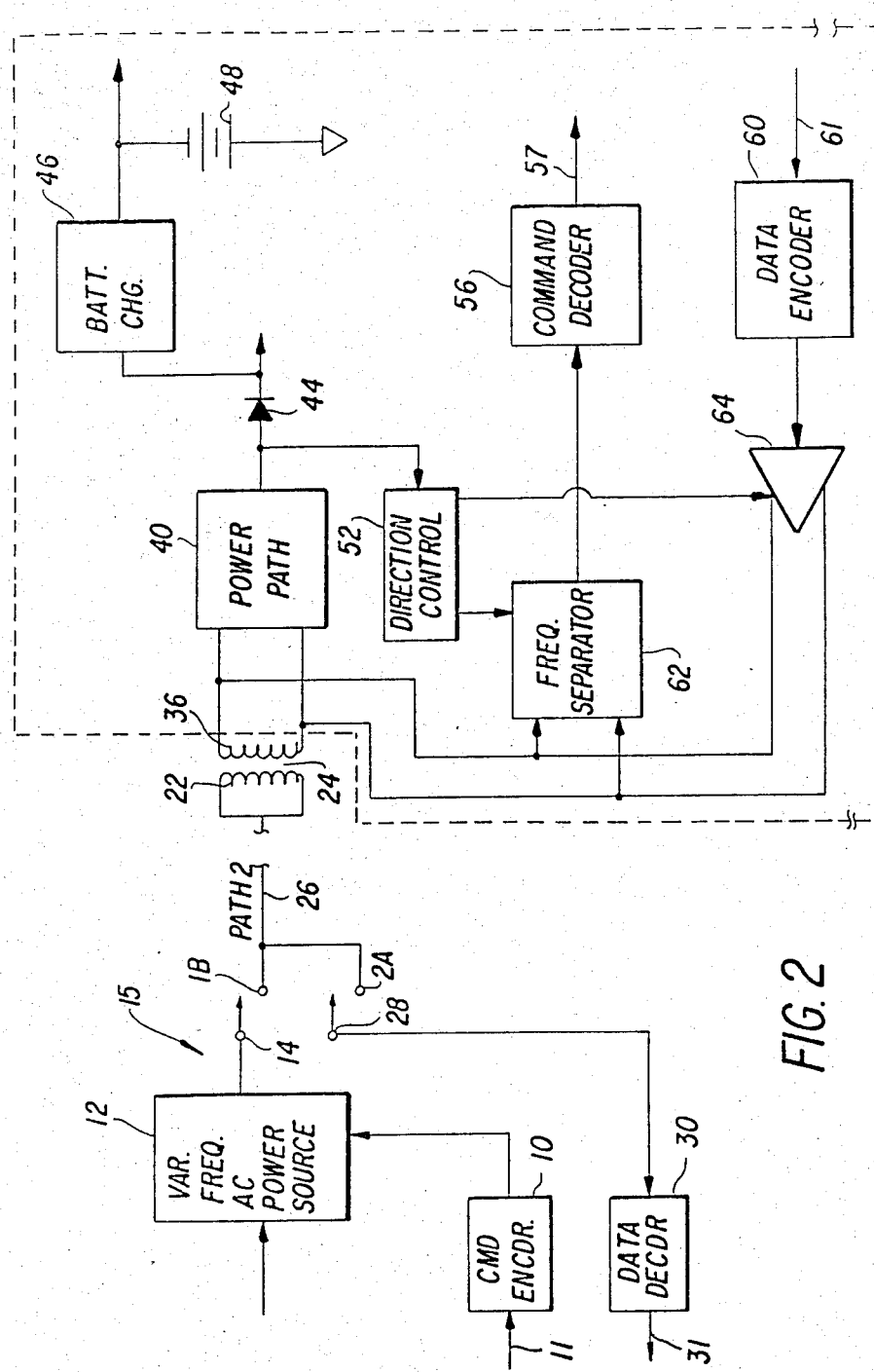
FIG. 2 is a single line partial block schematic diagram showing the embodiment of FIG. 1 in a half duplex mode.

Referring now to FIG. 2, in the event that path 1 is rendered inoperative, the interface can be altered from its full-duplex operational mode by using mode select switch 15 to move switching element 28 to disconnect data decoder 30 from coupler 24 via pole 2A andto move switching element 14 to connect power source 12 to coupler 24 via pole 1B and path 2 provided by conductor pair 26, thereby placing the interface in a half-duplex mode of operation. In this mode, the presence of a power component across secondary side 36 causes control stage 52 to apply an enabling signal to frequency separator 62 while holding local transmitter 64 in a disabled condition. Consequently, the command component applied across secondary side 36 is enabled to pass via frequency separator 62 to command decoder 56. When the power component is removed from path 2, control stage 52 applies an enabling signal to local transmitter 64 while ceasing application of the enabling signal to frequency separator 62, thereby isolating command decoder 56 from path 2 and enabling encoded data signals to be applied via coupler 24 and connector pair 26 to decoder 30.

Alternatively, and in the event that path 2 rather than path 1 is rendered inoperative for some reason, the interface can function in a half-duplex mode. As may be seen in FIG. 1, by alternately moving switching element 28 to its pole 2B and switching element 15 to its pole 1A, path 1 may be used in a half-duplex mode to provide full command, power and data transmission for command encoder 10 and data reception for data decoder 30 at the central command location with command decoder 56 and data encoder 60 in the remotely located network.

Figure 3:
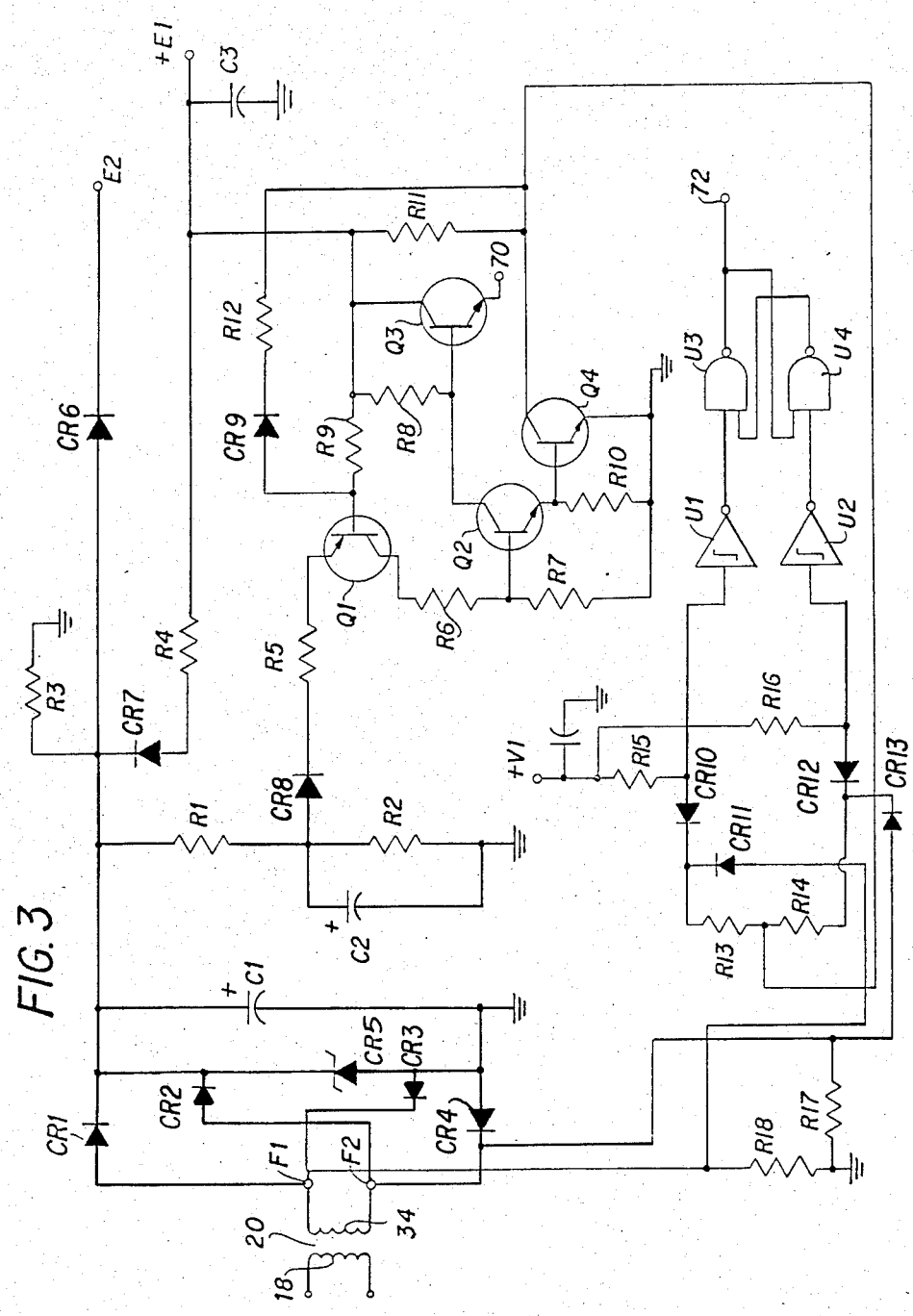
FIG. 3 is a block schematic diagram showing a direction control stage for the embodiment of FIG. 1.

In FIG. 3, a representative embodiment of one configuration of the power path, direction control state, and part of a frequency separation filter stage are shown for one-half of an asynchronous remote network with secondary side 34 of inductive coupler 20 coupled at junctions F1, F2 across a rectifier and filter stage formed with diodes CR1–CR4 and capacitor C1. A zener diode CR5 and a filtering capacitor C1 are coupled between diodes CR1, CR2 with the junction between diode CR3, CR4, CR5 and capacitor C1 connected to a local reference potential. A voltage divider is formed by a resistance R1 having one side coupled to capacitor C1 while the other side of resistance R1 is coupled to the local reference potential via capacitance C2 coupled in parallel with resistance R2. The junction between resistance R1 and diode CR1 is connected via resistance R3 to the local reference potential, via diode CR6 to an unregulated E2 potential, and to a positive biasing potential E1 via diode CR7 and resistance R4. The rectifier and filtering stage of the power path is coupled to a transistor voltage comparator stage which uses a local battery (not shown) to provide reference potentials and a source E1 of biasing current.

The junction of the voltage divider formed by resistances R1, R2 is coupled via diode CR8 and resistance R5 to the emitter of a PNP type transistor Q1. The collector of transistor Q1 is coupled via resistances R6, R7 to the local reference potential while the junction between those resistances is coupled to the base of an NPN type transistor Q2. The collector of transistor Q2 is coupled directly to the base of an NPN type transistor Q3 and, via resistance R8, is coupled together with the collector of transistor Q3 to one side of a resistance R9 coupled to the base of transistor Q1. The emitter of transistor Q2 is coupled directly to the base of an NPN type transistor Q4 and, via a resistance R10, to the local reference potential. The emitter of transistor Q4 is connected directly to the local reference potential while its collector is coupled via a resistance R11 to the junction between resistances R8, R9. A diode CR9 and a resistance R12 couple the base of transistor Q1 to the collector of transistor Q4. The collector of transistor Q3 and the junction between resistances R9, R11 is coupled to biasing current source E1 and to an alternating current bypass capacitor C3 coupled to the local reference potential.

The voltage comparator circuit serves as one of the two direction control stages for the remote network. In the absence of the transmission of a down-link command signal having a power component, capacitance C2 discharges, thereby allowing the local battery potential E1 to hold the base of transistor Q1 in a non-conducting state. Consequently, the base of transistor Q2 is also biased into a non-conducting state, thereby holding its collector at a potential sufficient to bias the base of transistor Q3 into a conducting state while the emitter of transistor Q2 is at a relatively low potential which causes the base of transistor Q4 to remain in a non-conducting state. During the absence of an incoming power signal component, transistor Q3 remains in a conducting state and current flows from battery potential E1 through the collector and emitter of transistor Q3 to junction 70.

During transmission of a command signal having a power component of sufficient duration to charge capacitor C2, the potential of the power component biases transistor Q1 into a conducting state. The current flow between the emitter and collector of transistor Q1 raises the potential on the base of transistor Q2 sufficiently to place transistor Q2 in a conducting state. As transistor Q2 begins to conduct, its collector voltage drops to zero, thereby removing the bias potential from the base of transistor Q3 and causing transistor Q3 to revert to a non-conducting state. Consequently, current flow between the collector and emitter of transistor Q3 falls to zero. The drop in current flow across the collector and emitter of transistor Q3, however, raises the potential at the base of transistor Q4, thereby placing transistor Q4 into a conducting state.

The collector of transistor Q4 is coupled between resistances R13 and R14 of a frequency separation stage. The frequency separation stage serves as one of two such stages in the remote network for separating the power component of a down-link signal from the command signal component. The unconnected sides of resistances R13, R14 are coupled via diodes CR11, CR13, respectively, to junctions F1, F2 to receive the alternate phase portions of the command component of a signal applied across coupler 20. A transistor Q4 begins to conduct, its collector potential falls to zero, thereby allowing a current to flow across a resistance R15 having one side at a positive potential V1 (lower in amplitude than the voltage of source E1), through diode CR10 and resistance R13 to ground potential because the positive voltage on the anode of diode CR11 coupled between the junction of diode CR10 and resistance R13, becomes lower than that due to a voltage division effect produced by resistances R13, R15. The current flow through resistances R13, R15 and diode CR10 raises the voltage drop across resistance R15 to the level of potential V1 (e.g., a regulated five volt level), thereby providing the current flow through the junction between resistance R13 and diodes CR10 and CR11.

Resistance R14 is coupled via diode CR12 and resistance R16 to source V1. Diode CR11 is coupled between the junction of resistance R13 and diode CR10, and junction F1 on one leg of secondary side 34 of the inductive coupler. Diode CR13 is coupled between the junction of resistance R14 and diode CR12, and junction F2 of secondary side 34. A pair of resistances R17, R18 having their intermediate junction coupled to the local reference potential, maintain junctions F1, F2 at the local reference potential in the absence of an incoming power signal.

While Q4 remains in a conducting state, transmission of a command signal component across coupler 20 causes, in alternate halves of the power cycle, the anodes of diodes CR11, CR13 to drop to the local reference potential. This alternately allows resistances R13, R14 to be connected to the local reference potential through transistor Q4, thereby alternately causing the potentials across resistances R15, R16 to fall below the threshold voltages of Schmitt trigger voltage comparators U1, U2. As the voltages across resistances R15, R16 alternately fall below the threshold voltages of the Schmidt triggers, the command signal component is passed in a differential mode as trains of pulses one hundred eighty degrees out of phase, to the latch formed by cross-coupled NAND gates U3, U4. The command signal component emerges from the cross coupled latch at terminal 72 as a series of square waves having the same frequency as the command signal component of the down-link power signal.

It is noted that the use of a differential command signal mode in the frequency separator assures that any noise level present during reception of the composite command and power signal will not result in a spurious signal which the subsequent command decode stage will attempt to convert. This feature advantageously improves the noise immunity of the command signal receiver portion of the data acquisition and transmission network.

Figure 4:
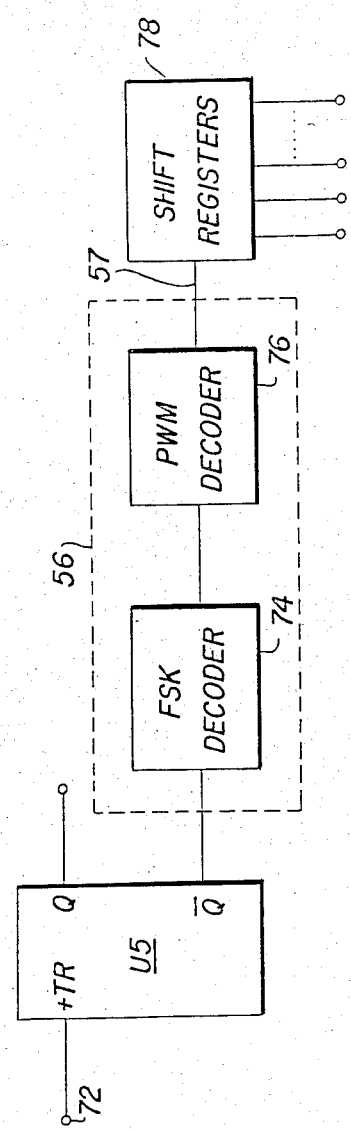
FIG. 4 is a schematic diagram of a frequency separator and command decoding stage.

Referring now to FIG. 4, the output from the cross-coupled latch is applied via terminal 72 to the positive TR input terminal of a one shot multi-vibrator U5 serving as a frequency gate to discriminate between the frequency band of down-link command signal components and idle frequencies. The timing cycle of multi-vibrator U1 is set to assure that when an input signal frequency is above a threshold value (i.e., when a pulse interval is shorter in time than the timing cycle of multi-vibrator U5), a Q output is provided; otherwise, then the frequency of an input signal falls below the threshold, a Q distinguishes the idle frequency from the frequency band of the command signal components. The $\overline{Q}$ output signals are applied to the command decoder stage 56 formed by a conventional frequency shift key decoder 74 and a conventional pulse width modulation decoder 76. Frequency shift key decoder 74 serves as a frequency discriminator distinguishing between the mark and space frequencies emanating from the $\overline{Q}$ output terminal of multi-vibrator U5. Frequency shift key decoder 74 applies its output, trains of binary mark-space pulses, to pulse width modulation decoder 76 which, in turn, compares the timing of the mark pulses to that of a single-shot multi-vibrator included within decoder 76. If the multi-vibrator is in a triggered condition at the conclusion of each mark pulse, the output of decoder 76 indicates that the width of the pulse was in the ZERO pulse band. Alternatively, if at the end of a mark pulse the multi-vibrator has completed its timing cycle, the output of decoder 76 indicates that the width of the pulse received was in the ONE pulse band. The output from pulse width modulation decoder 76 is a command signal in the binary form of a serial train of ONE and ZERO bits which is applied via lead 57 to shift registers 78. The command signals are stored and sorted in the shift registers and then applied to control various items of local process equipment (not shown).

Figure 5:
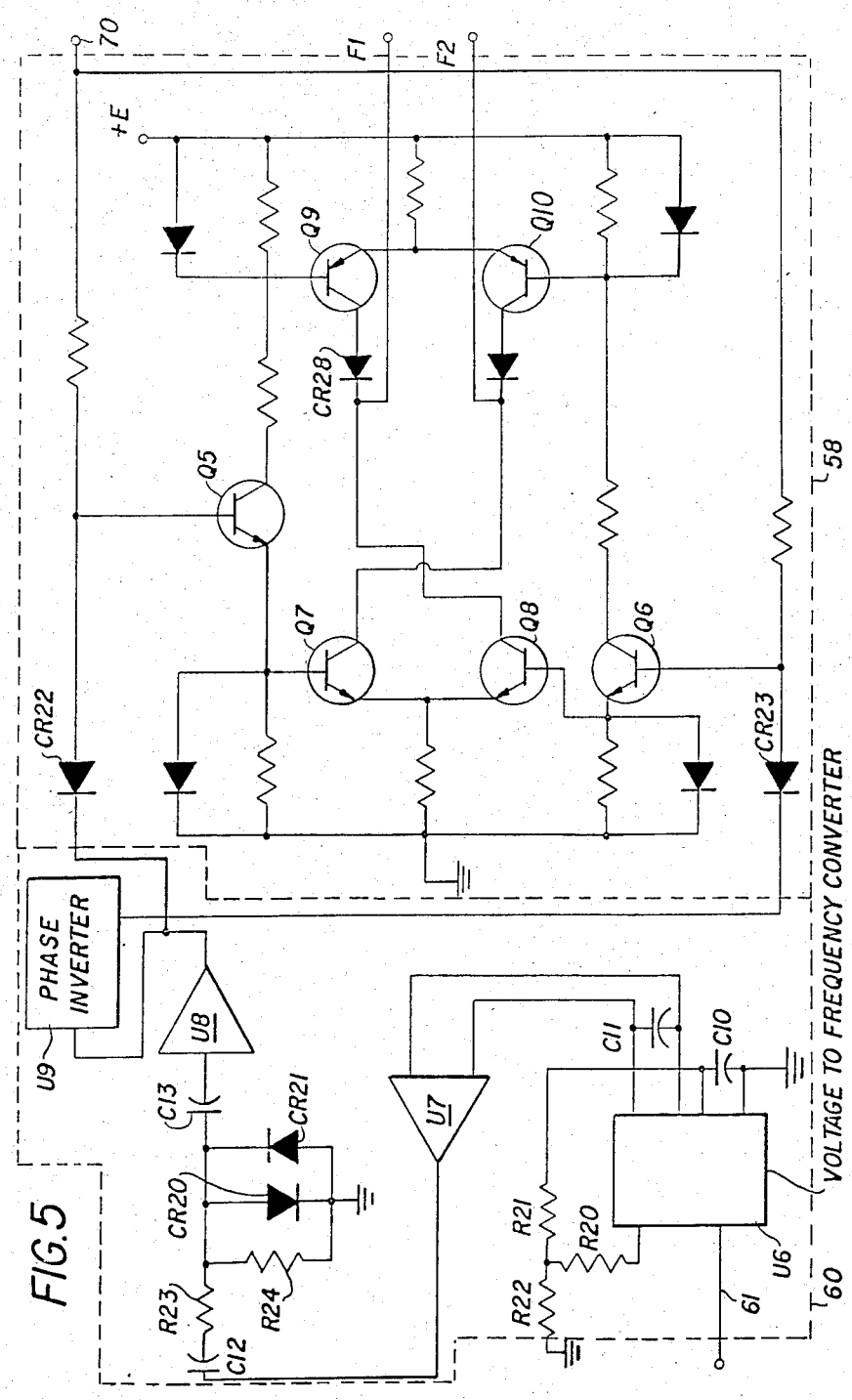
FIG. 5 is a schematic diagram of a data encoder and data transmitter stage.

FIG. 5 illustrates details of a typical data encoder stage 60 and a push-pull transmitter stage 58 which may be used for transmission of uplink data signals via path 1 in the embodiment shown in FIG. 1. An identical transmitter stage (not shown) may be coupled to data encoder stage 60 to permit uplink data transmission via path 2. Analog signals from a plurality of local and remote sources are sequentially coupled by multiplexers (not shown) to a voltage-to-frequency converter U6 via input terminal 61. Converter U6 is a commercially available device such as the model AD537SH manufactured by Analog Devices, Inc. Resistances R20, R21 and R22 and capacitance C10 are externally coupled components used to calibrate converter U6. Converter U6 changes the analog signals into a differential mode, variable frequency output applied across capacitor C11 to the input ports of an amplifier stage U7. The waveform of the variable frequency signal supplied by converter U6 and amplifier U7 has a generally triangular shape; the signal is applied via coupling capacitor C12 and resistance R23 to a waveform shaper formed by an array of non-linear diodes CR20, CR21 coupled back-to-back in parallel with resistance R24 to the local reference potential. This diode array roughly converts the triangular waveform into an approximation of a sinusoidal wave which is applied via coupling capacitor C13 to amplifier U8. The output of amplifier U8 is applied both via diode CR22 to the base of a transistor Q5 in transmitter stage 58, and to a phase inverter U9. The phase inverted output from inverter U9 is applied via diode CR23 to the base of transistor Q6 in transmitter stage 58.

Referring briefly to FIG. 3, it is noted that while transistor Q3 is in a conducting state, a bias current flowing from source E1 across the collector and emitter of transistor Q3 and terminal 70 provides bias currents across the base and emitter terminals of transistors Q5, Q6 shown in the transmitter stage in FIG. 5. Consequently, sine waves of the differential mode data signals emanating from amplifier U8 and phase inverter U9 applied to the base electrodes of transistors Q5, Q6, respectively, produce enough current across their base-emitter electrodes to hold transistors Q5, Q6 in conducting states. Transistors Q5, Q6 alternately conduct because the differential mode, sinusoidal data signals provided by diodes CR22, CR23 have one hundred eighty degrees of phase difference. This allows the push-pull amplification stage provided by transistors Q7, Q8 and Q9, Q10 to produce a differential mode, sinusoidal data signal across junctions F1, F2. Consequently, while transistor Q3 remains in a conducting state during the absence of a power signal component across coupler 20, transmitter stage 58 is enabled to apply a differential mode, sinusoidal data signal across junctions F1, F2 of secondary side 34, thereby transmitting the data signal across coupler 20 to a data decoder at a central command location coupled via path 1 and mode shifting switch 15. The application of voltage source E1 to the ungrounded side of capacitor C1 assures that capacitor C1 remains charged during uplink transmission of data signals, to keep rectifier diodes CR1, CR2, CR3 and CR4 in their non-conducting state. The level of voltage E1 is sufficiently low to cause the directional control 52 function to be in the uplink enable mode. This preserves isolation between the frequency separator and command decoder stages and the data transmitter stage, during uplink transmissions.

It may be seen from the foregoing description that the cooperative interaction between the directional controls and the frequency separators and data transmitters assures that during transmission of a command signal, the data transmitters are held in a true off state so as to not interfere with the down-link command signal transmission. During the absence of a down-link command transmission, the non-conducting state of transistor Q4 holds the frequency separator coupled to transmission path 1 in a non-enabled state, thereby assuring that data transmitter 58 is able to provide uninterrupted transmission of data signals via the same transmission path while mode-shifting switch 15 connects decoder 30 to path 1.

It is noted that the insertion of additional rectifying elements in the rectifier stage shown in FIG. 3 between secondary side 34 of coupler 20 and the filter formed by diode CR3 and capacitor C1, and between secondary side 34 and Schmitt triggers U1, U2 of the frequency separator will enable the embodiment described to be used as an interface in transmission systems having three phase power signal components.

It is apparent from the foregoing that the invention described provides a signal transmission method and an electrical interface enabling reliable transmission of down-link command and power signals over one signal path and simultaneous uplink transmission of encoded data signals over a second signal path. Alternatively, in the event that one of the signal paths becomes unavailable, the redundant structure of the interface assures that the remote network is enabled to make alternate down-link and up-link transmissions over a single signal path by isolating the command receiver portion of the remote network while enabling a corresponding data transmitter during the absence of down-link transmission. These features render the embodiment described particularly suitable for use in severe operating enviroments where there is a risk that one of the signal transmission paths may become inoperative, either during or after installation.

What is claimed is:

1. A multiple-mode electrical power and communication interface, comprising:
    means for generating an electrical power signal;
    command encoding means coupled to said generating means for receiving and encoding command words into command signals exhibiting a plurality of discrete frequencies, and for applying said command signals to said generating means to modulate the instantaneous frequency of said electrical power signal, whereby said electrical power signal includes a command component and a power component;
    data decoding means for receiving and decoding data signals;
    first and second discrete couplers each having primary and secondary sides;
    connecting means for providing electrically distinct first and second signal paths for simultaneously coupling said generating means and said data decoding means via selected ones of said first and second paths to the primary sides of different ones of said first and second couplers, one of said signal paths being coupled by said connecting means to conduct said electrical power signal and the other one of said signal paths being coupled by said connecting means to conduct said data signals;
    a network normally located remotely from said command encoding means and separately coupled to said secondary sides of said first and second couplers, including:
        command decoding means for decoding said command signals from said command component;
        data encoding means for encoding and transmitting information as data signals; and
        control means responsive to reception of said power component across said couplers for enabling said command decoding means to receive said command signals via said one of said signal paths coupled to conduct said electrical power signal, for isolating said data encoding means from said one of said signal paths coupled to conduct said electrical power signal, and for enabling said data encoding means to transmit said data signals via the one of said signal paths coupled to conduct said data signals.

2. The interface of claim 1, wherein said connecting means includes means for switching said connecting means to alternately couple said generating means and said data decoding means to the same one of said first and second paths.

3. The interface of claim 2, wherein said control means comprises:
    directional means responsive to the transmission of said power component across said couplers for providing a first responsive signal during reception of said power component across one of said couplers and providing a second responsive signal during the absence of said power component across one of said couplers.

4. The interface of claim 3, wherein said network includes filtering means coupled between said command decoding means and respective ones of the secondary sides of said first and second couplers and activated by said first responsive signal for passing said command component between said one of said signal paths coupled to conduct said electrical power signal and said command decoding means.

5. The interface of claim 4, wherein said network includes transmitter means coupled between said data encoding means and said couplers and activated by said second responsive signal for transmitting said data signals via the one of said signal paths coupled to conduct said data signals.

6. The interface of claim 3, wherein said command decoding means comprises:
    first filtering means coupled across the secondary side of said first coupler and activated by said first responsive signal during transmission of said power component across said first coupler, for separating said command component from said power component; and
    second filtering means coupled across the secondary of said second coupler and activated by said first responsive signal during transmission of said power component across said second coupler, for separating said command component from said power component.

7. The interface of claim 6, wherein said data encoding means comprises:
    first transmitter means coupled across the secondary side of said first coupler and activated by said second responsive signal during the absence of said power component across said first coupler, for transmitting said data signals across said first coupler; and
    second transmitter means coupled across the secondary side of said second coupler and activated by said second responsive signal during the absence of said power component across said second coupler, for transmitting said data signals across said second coupler.

8. A multiple-mode electrical power and communication interface, comprising:
    means for generating an electrical power signal;
    command encoding means coupled to said generating means for receiving and encoding command words into command signals exhibiting a plurality of discrete frequencies, and for applying said command signals to said generating means to modulate the instantaneous frequency of said electrical power signal, whereby said electrical power signal includes a command component and a power component;
    first and second discrete couplers each having primary and secondary sides;

data decoding means for receiving and decoding data signals;

connecting means for providing electrically distinct first and second signal paths for simultaneously coupling said generating means and said data decoding means via selected ones of said first and second paths to the primary sides of different ones of said first and second couplers;

a network normally located remotely from said command encoding means and separately coupled to said secondary sides of said first and second couplers, including:

first control means for providing a first enabling signal during transmission of said power component across said first coupler and a second enabling signal during the absence of said power component across said second coupler;

second control means for providing a third enabling signal during transmission of said power component across said second coupler and providing a fourth enabling signal during the absence of said power component across said second coupler;

command decoding means connected to said secondary sides of said first and second couplers for decoding said command signals from said command component during generation of said first and third enabling signals;

data encoding means for receiving and encoding information as data signals; first transmitter means coupled between said data encoding means and said first coupler for transmitting said data signals across said first coupler during generation of said second enabling signal; and second transmitter means coupled between said data encoding means and said second coupler for transmitting said data signals across said second coupler during generation of said fourth enabling signal.

9. The interface of claim 8, wherein said connecting means includes switching means interpositioned between said generating means, data decoding means and connecting means for simultaneously connecting said generating means and said data decoding means to different ones of said first and second paths and for alternately connecting said generating means and said data decoding means to the same one of said first and second paths.

10. The interface of claim 9, wherein said network includes:

first filtering means coupled between said command decoding means and the secondary side of said first coupler and activated by said first enabling signal to separate said command component from said power component; and second filtering means coupled between said command decoding means and the secondary side of said second coupler and activated by said fourth enabling signal to separate said command component from said power component.

11. The interface of claim 10, wherein said network includes a source of electrical energy charged by said power component for providing said energy to said first transmitting means during generation of said second enabling signal and to said second transmitting means during generation of said fourth enabling signal.

12. A method for multiple-mode transmission of electrical power and communication signals, comprising:

generating an electrical power signal;

encoding command words into command signals exhibiting a plurality of discrete frequencies;

applying the command signals to modulate the instantaneous frequency of said electrical power signal, whereby said electrical power signal includes a command component and a power component;

coupling one of a pair of signal paths to conduct said electrical power signal and the other of the pair of said signal paths to conduct data signals;

detecting the transmission of said electrical power signal over the one of said signal paths;

activating a first stage connected to the one of said signal paths coupled to conduct said electrical power signal, to separate said command component from said power component;

decoding said command signals from said command component;

detecting the absence of said power component across the other of said signal paths;

encoding information into data signals;

transmitting the data signals via the other of said pair of signal paths coupled to conduct said data signals in response to and during the absence of said power component across the other of said signal paths; and receiving and decoding the data signals into information.

13. The method of claim 12, further comprising the step of simultaneously transmitting said power signal across the one of the pair of said signal paths coupled to conduct said electrical power signal and transmitting said data signals across the other of the pair of said signal paths.

14. The method of claim 13, further comprising isolating said command component from the other of said pair of signal paths coupled to conduct said data signals during the absence of transmission of said power signal over the other of said pair of signal paths coupled to conduct said data signals.

15. The method of claim 13, further comprising the step of switching said signal paths to provide for sequential transmission of said electrical power signal and data signals across a single one of said signal paths.

16. The method of claim 15, further comprising isolating said data signals from the one of said pair of signal paths coupled to conduct said electrical power signal during transmission of said electrical power signal over the one of said pair of signal paths.

* * * * *